Nov. 10, 1936.  D. T. BOLLING  2,060,548
ROD COUPLING
Filed June 3, 1935
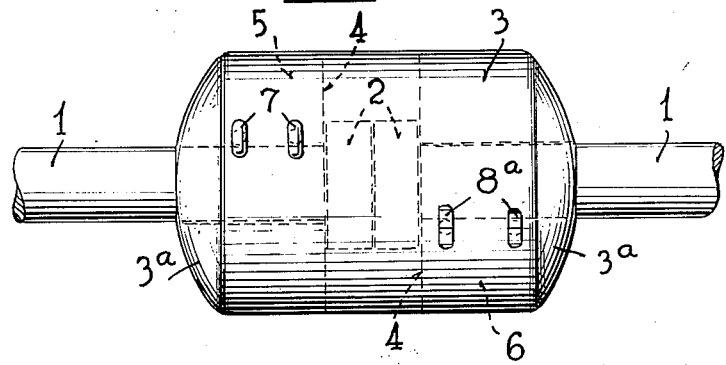
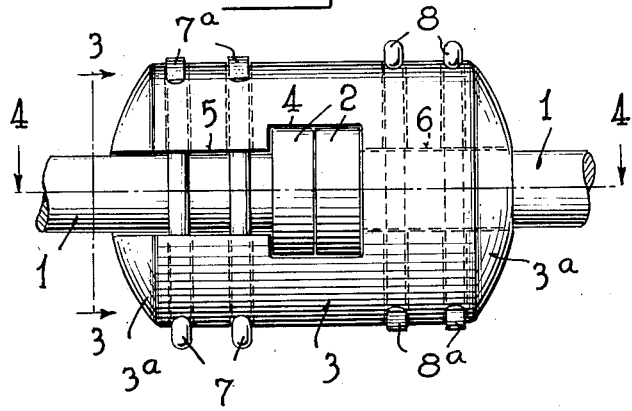 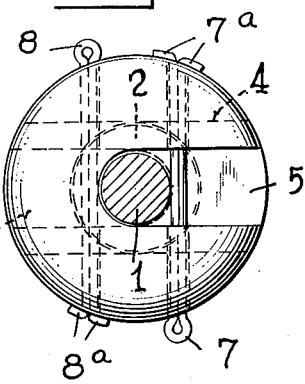
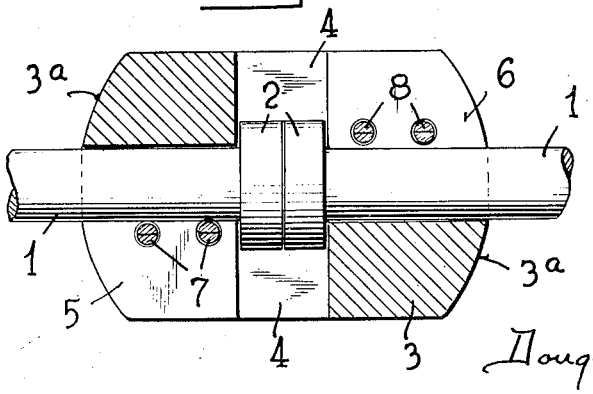
Inventor
Douglass T. Bolling,
By Stone, Boyden & Mack,
Attorneys Patented Nov. 10, 1936

2,060,548

UNITED STATES PATENT OFFICE 2,060,548

ROD COUPLING

Douglass T. Bolling, Owensboro, Ky.

Application June 3, 1935, Serial No. 24,751

1 Claim. (Cl. 287—113)

This invention relates to rod joints or couplings, and more particularly to couplings for reciprocatory headed rods of the type employed for transmitting power, as, for example, in operating the pumps of oil wells from a source of power located at a considerable distance therefrom.

Among the objects of the invention are to provide an improved coupling of this character which shall be simple, cheap and rugged in construction, capable of being readily connected and disconnected, and in which the use of bolts or other threaded fastenings is obviated.

In order that the invention may be readily understood, reference is had to the accompanying drawing, forming part of this specification and in which:

Fig. 1 is a side view of my improved coupling showing two rod ends in position therein;

Fig. 2 is a similar view at right angles to that of Fig. 1;

Fig. 3 is a transverse section on the line 3—3 of Fig. 2, looking in the direction of the arrows; and Fig. 4 is a longitudinal section on the line 4—4 of Fig. 2, looking in the direction of the arrows, parts being shown in elevation.

Referring to the drawing in detail, I designates the rods to be coupled, which rods are shown as provided at their ends with flat circular heads 2.

My improved coupling comprises a one piece socket member 3, which, as shown, is preferably substantially cylindrical in shape, or at least is circular in cross section, and is provided with rounded ends 3ª.

Extending transversely through the middle of the socket member 3 is a rectangular opening 4, of such size as to snugly receive the two rod heads 2 when they are placed end to end in abutting relation, as shown in Fig. 2.

Extending from the opening 4 to the opposite ends of the socket member 3, and preferably disposed at opposite sides thereof are a pair of open radial slots 5 and 6. As clearly shown in Figs. 2 and 3, the width of these slots is such as to freely receive the rods I, but not the heads 2. In other words, the width of these slots is greater than the diameter of the rods, but less than the diameter of the heads.

From the foregoing, it will be obvious that in applying my improved coupling to join the adjacent ends of a pair of rods, the rod ends are inserted laterally from opposite sides into the slots 5 and 6, the heads 2 entering the opening 4 from the opposite ends thereof. Each slot 5 and 6 is of a depth somewhat greater than the radius of the socket member, so that when the rods engage the bottoms of the respective slots, they will lie in substantial alignment, as shown in Fig. 4, with their axes coincident with the axis of the socket member.

After the rod ends have been inserted in the coupling member, as above described, they are retained in position therein by means of transversely extending pins 7 and 8. These are shown as cotter pins, the ends 7ª and 8ª of which are adapted to be spread in order to hold the pins in place. While I have shown a pair of such pins in connection with each slot 5 and 6, it will of course be understood that a greater or less number can be employed, as desired.

It will thus be seen that I have provided a coupling consisting of only one single piece, having no auxiliary or detachable parts whatsoever except the pins 7 and 8. The use of these pins obviates the necessity for bolts or other threaded fastenings of any kind, which have often been found objectionable. Furthermore, the construction of my improved coupling is such that the rod ends may be quickly and easily assembled therein and it is only necessary to withdraw the pins when it is desired to disconnect the rod ends.

It is thought that the simplicity, practicability and many advantages of my improved coupling will be readily appreciated by those skilled in the art, without further discussion.

What I claim is:

A coupling for reciprocatory headed rods comprising a one piece socket member, circular in cross-section, and having an opening extending diametrically therethrough of a size to snugly receive a pair of rod heads when disposed end to end in abutting relation, said member also having a pair of radial slots extending inwardly from opposite sides at opposite ends thereof to a point beyond the axis, said slots communicating at one end with said opening and being of a width to freely admit the rods but not the heads, whereby a pair of headed rods may be inserted into said opening and slots by a lateral movement and assembled in substantial alignment within said socket member, and means for preventing lateral displacement of said rods in said slots, after they have been assembled.

DOUGLASS T. BOLLING.